(12) United States Patent
Kawasaki et al.

(10) Patent No.: US 8,582,401 B2
(45) Date of Patent: Nov. 12, 2013

(54) LIBRARY DEVICE INCLUDING A TAPERED SHAPE INSERTION RELEASE PART, METHOD OF TAKING OUT DATA CARTRIDGE, AND METHOD OF RECEIVING THE DATA CARTRIDGE

(75) Inventors: Toshimitsu Kawasaki, Tokyo (JP); Manabu Tsuchiya, Tokyo (JP); Tadashi Kosugi, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 249 days.

(21) Appl. No.: 12/733,506

(22) PCT Filed: Sep. 22, 2008

(86) PCT No.: PCT/JP2008/067054
§ 371 (c)(1),
(2), (4) Date: Mar. 4, 2010

(87) PCT Pub. No.: WO2009/041374
PCT Pub. Date: Apr. 2, 2009

(65) Prior Publication Data
US 2010/0254039 A1    Oct. 7, 2010

(30) Foreign Application Priority Data

Sep. 28, 2007   (JP) ................................ 2007-253985

(51) Int. Cl.
*G11B 21/08* (2006.01)
(52) U.S. Cl.
USPC ...................................................... 369/30.48
(58) Field of Classification Search
USPC .................... 720/600, 601, 632; 360/92.1, 360/98.04–98.06; 369/30.38–30.58; 414/266, 277, 281
See application file for complete search history.

(56) References Cited

U.S. PATENT DOCUMENTS

| | | | |
|---|---|---|---|
| 5,255,251 | A | 10/1993 | Fitzgerald et al. |
| 5,793,714 | A | 8/1998 | Inoue et al. |

(Continued)

FOREIGN PATENT DOCUMENTS

| | | |
|---|---|---|
| JP | 57-186201 | 11/1982 |
| JP | 60-261067 | 12/1985 |

(Continued)

OTHER PUBLICATIONS

European Search Report dated Apr. 19, 2011.

(Continued)

*Primary Examiner* — Joseph Feild
*Assistant Examiner* — Gustavo Polo
(74) *Attorney, Agent, or Firm* — McGinn Intellectual Property Law Group, PLLC (57) ABSTRACT

A cell (300) includes a cartridge lock (306) at its opening for securing a data cartridge (100) in the cell by locking. A picker mechanism (500) includes a picker arm (521) and an ejection release part (522) for releasing locking realized by the cartridge lock (306). When the data cartridge (100) is to be inserted into the cell (300), the cartridge lock (306) is caused to retract as far as a position at which locking is released by a tapered surface (101) that is provided on the data cartridge (100); and when the data cartridge (100) is to be ejected from the cell (300), cartridge lock (306) is released by the ejection release part (522) at the same time that picker arm (521) engages engagement hole (102).

8 Claims, 11 Drawing Sheets

(56) References Cited

U.S. PATENT DOCUMENTS

2005/0162774 A1 7/2005 Yoshida
2005/0162775 A1 7/2005 Ojima et al.
2007/0230036 A1* 10/2007 Nave et al. .................. 360/92

FOREIGN PATENT DOCUMENTS

| JP | 64-46253 A | 2/1989 |
| JP | 1-146157 A | 6/1989 |
| JP | 2-185755 A | 7/1990 |
| JP | 3-130032 | 12/1991 |
| JP | 5-109166 A | 4/1993 |
| JP | 5-144146 A | 6/1993 |
| JP | 5-258431 A | 10/1993 |
| JP | 5-307826 | 11/1993 |
| JP | 7-505850 | 6/1995 |
| JP | 2005-209278 | 8/2005 |
| JP | 2005-209279 | 8/2005 |

OTHER PUBLICATIONS

Japanese Office Action dated Apr. 16, 2013 with English translation.

* cited by examiner

LIBRARY DEVICE INCLUDING A TAPERED SHAPE INSERTION RELEASE PART, METHOD OF TAKING OUT DATA CARTRIDGE, AND METHOD OF RECEIVING THE DATA CARTRIDGE

TECHNICAL FIELD

The present invention relates to a library device, method of taking out data cartridge, and method of receiving the data cartridge for not only housing a plurality of data cartridges such as magnetic tape, magnetic disks, optical disks, or magneto-optical disks, but for also selectively picking out a desired data cartridge from among these data cartridges and carrying out reading/writing of data by an internal drive device.

BACKGROUND ART

As shown by JP-A-2005-209278, a library device (in some cases also referred to as "data storage system") is known in which data cartridges are housed in a plurality of cells of a magazine, a desired data cartridge is selectively picked out from among these data cartridges, and reading/writing of data is then carried out by a drive device.

Figure 1A:
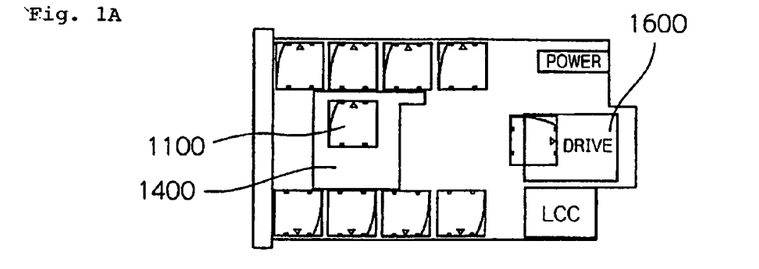
FIG. 1A is a plan view of a library device that is related to the present invention.
Figure 1B:
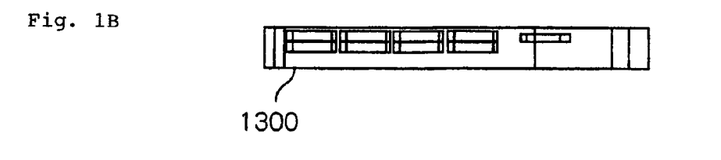
FIG. 1B is a front view of a library device that is related to the present invention.
Figure 2:
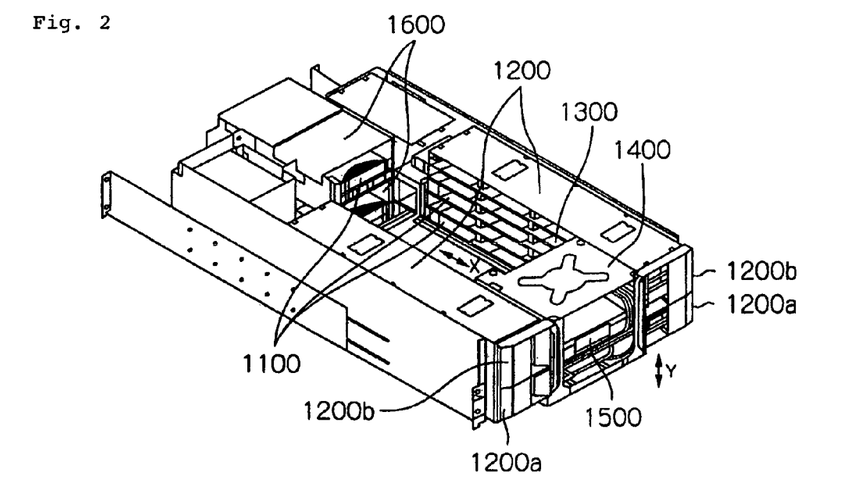
FIG. 2 is an outer perspective view of an example of a library device that is related to the present invention.

FIG. 1A is a plan view of a library device related to the present invention. FIG. 1B is a front view of the library device related to the present invention. FIG. 2 is an outer perspective view of the example of a library device related to the present invention.

As shown in FIG. 1A and FIG. 2, the library device related to the present invention includes: magazines 1200, two drive devices 1600, and accessor mechanism 1400. Magazines 1200 include a plurality of cells 1300 for accommodating data cartridges 1100 in a stacked state and in a horizontal state. Drive devices 1600 carry out reading of data from and writing of data to the recording medium in data cartridges 1100. Accessor mechanism 1400 transports data cartridges 1100.

In the library device that is related to the present invention, two magazines 1200 are oppositely arranged such that the openings of cells 1300 confront each other. In addition, in the library device that is related to the present invention, two drive devices 1600 are arranged one over the other close to one end of these two magazines 1200. The two magazines 1200 and drive devices 1600 are arranged to make a substantially U-shaped form. The open directions of the openings of cells 1300 of two magazines 1200 face in directions orthogonal to the X-direction, and moreover, are directed to confront each other. The open direction of drive devices 1600 is the X-direction that differs from the directions of both of the opening directions of two magazines 1200.

In this way, the opening directions of each of cells 1300 inside two magazines 1200 and drive devices 1600 are all different. As a result, a swivel mechanism for rotating picker mechanism 1500 is provided in accessor mechanism 1400 for removing data cartridges 1100 from each of cells 1300 and inserting data cartridges into each of drive devices 1600.

Figure 3:
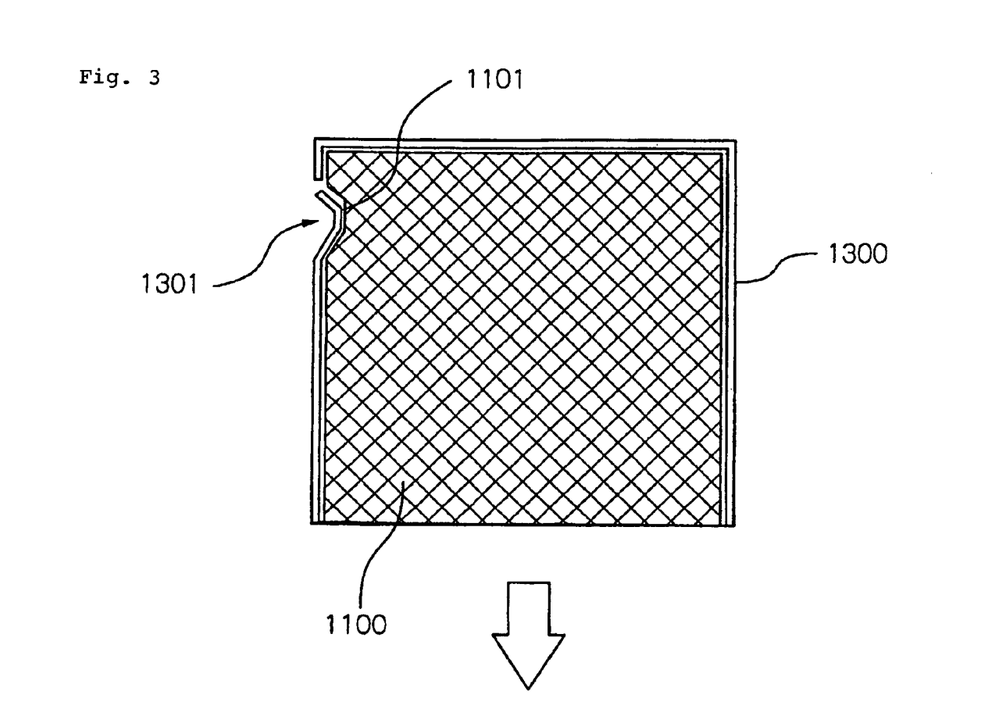
FIG. 3 is a schematic plan view of a cell and data cartridge that are related to the present invention.

Next, FIG. 3 shows a schematic plan view of a cell and data cartridge relating to the present invention.

Protrusion 1301 of a plate spring structure that protrudes inside is provided on the side of cell 1300. On the other hand, notch 1101 is formed at a position that corresponds to protrusion 1301 in data cartridge 1100. The engagement of protrusion 1301 in notch 1101 prevents unintended removal of data cartridge 1100 from cell 1300. The insertion into and removal from cell 1300 of data cartridge 1100 is carried out while pressing back this protrusion 1301.

In the library device shown in FIG. 1A and FIG. 2, however, magazines 1200 are arranged on both sides of accessor mechanism 1400. In addition, the necessity of a swivel mechanism for rotating picker mechanism 1500 on accessor mechanism 1400 increases the size of accessor mechanism 1400. As a result, the library device requires a large installation space, and further, the complex construction of accessor mechanism 1400 entails high costs.

In response, the adoption of cells of the so-called housing-cell type as well as a modification of the layout of the magazines and drive devices can be considered. A housing cell refers to a cell of a type that allows housing of a plurality of data cartridges in one cell. In the following explanation, a housing cell is referred to as a deep cell. As the layout of the library device, a layout is considered in which a magazine that accommodates deep cells and a drive device for this magazine are aligned, and the opening direction of the deep cells and the opening direction of the drive device are arranged in one direction. This layout both allows consolidation to a single magazine and a reduction of the installation space of the library device due to elimination of the need for a swivel mechanism in the accessor mechanism.

DISCLOSURE OF THE INVENTION

Nevertheless, when the above-described deep cell method is adopted, adoption of the construction shown in FIG. 3 is problematic. In the deep cell method, a plurality of, for example, two data cartridges is accommodated inside cells. In addition, energizing means in the direction of the opening of the cells is provided in the cells. When only one data cartridge is stored, the energizing power of this energizing means presents no particular problem. However, problems sometimes occur when another data cartridge is then stored inside the cell. Specifically, the energizing load resulting from the energizing means becomes excessively high due to the storage of the second data cartridge, resulting in difficulty in securely holding the data cartridge inside the cell by means of the engagement realized by the protrusion and notch shown in FIG. 3.

Even assuming the use of a constant-force spring as the energizing means, the protrusion for each data cartridge, i.e., two protrusions, must be pressed back during insertion and removal. A greater drive power is therefore required, and this complicates realization of a smaller, energy-conserving device.

As a countermeasure, providing, for example, a catch in the cell opening to prevent the unintended ejection of the data cartridge can be considered, but the provision of a complex mechanism for the engagement and release of the catch again complicates realization of a more compact and energy-conserving device, and further, adds to costs.

It is therefore an object of the present invention to provide a library device, a method of taking out data cartridge and a method of receiving the data cartridge that can reliably hold a data cartridge in a cell by means of a simple configuration, and moreover, that reduces size and conserves energy.

To achieve the above-described object, the library device of the present invention includes:

a drive device for carrying out reading and writing of a recording medium that is accommodated in a data cartridge;

a cell for storing a plurality of data cartridges in a row;

an energizing means for energizing, in the direction of ejection from the cell, the plurality of data cartridges accommodated in a cell;

a magazine provided with a plurality of cells;

a picker mechanism for carrying out insertion of a data cartridge into and removal of a data cartridge from the drive device and the cells; and an accessor mechanism equipped with the picker mechanism for transporting the picker mechanism between the drive device and each cell;

wherein:

the drive device and cells are aligned such that the opening directions of the opening of the drive device and the openings of cells in the magazine are the same direction;

each cell has a cartridge lock in its opening for holding a data cartridge in the cell by locking;

the picker mechanism includes a picker arm that engages with an engagement hole formed in a data cartridge and an ejection release part for releasing the locking realized by the cartridge lock; and when a data cartridge is to be ejected from a cell, moving the accessor mechanism causes the cartridge lock to be released by the ejection release part at the same time that the picker arm engages with the engagement hole; and when a data cartridge is to be inserted into a cell, moving the picker mechanism to cause the data cartridge to move in the direction of insertion into the cell causes the cartridge lock to be retracted as far as a position at which locking is released by an insertion release part provided on the data cartridge.

The method of taking out data cartridge of the present invention is a method of taking out a data cartridge from a cell in the library device of the present invention in which moving the accessor mechanism causes the ejection release part to release locking of the cartridge lock at the same time that the picker arm engages with the engagement hole.

The method of receiving a data cartridge of the present invention is a method of receiving a data cartridge in a cell in the library device of the present invention in which moving the picker mechanism to cause the data cartridge to move in the direction of insertion into the cell causes the cartridge lock to retract as far as a position at which locking is released by the insertion release part.

The library device of the present invention can reliably hold data cartridges in a cell by means of a simple configuration, and further, realizes miniaturization and energy conservation.

BEST MODE FOR CARRYING OUT THE INVENTION

Explanation next regards exemplary embodiments of the present invention with reference to the accompanying figures.

Figure 4A:
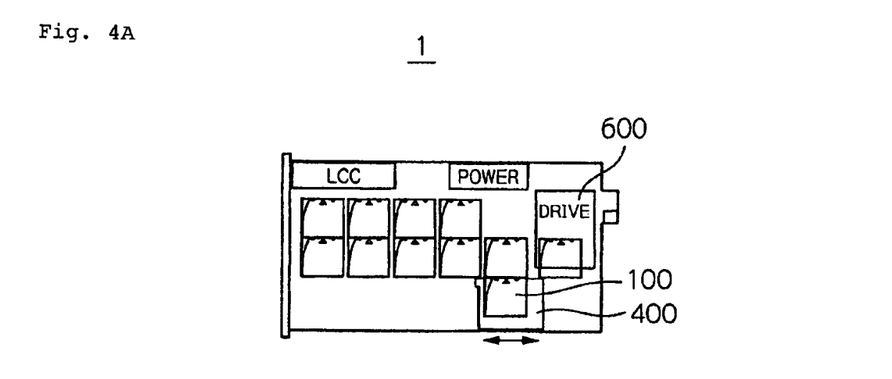
FIG. 4A is a plan view of an exemplary embodiment of the library device of the present invention.
Figure 4B:
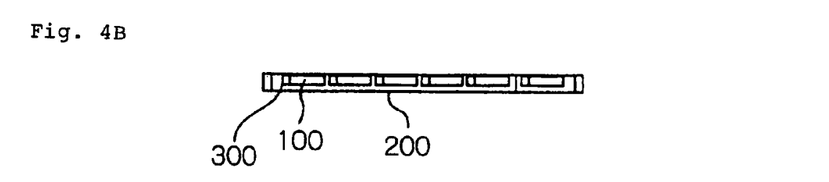
FIG. 4B is a front view of an exemplary embodiment of the library device of the present invention.
Figure 5:
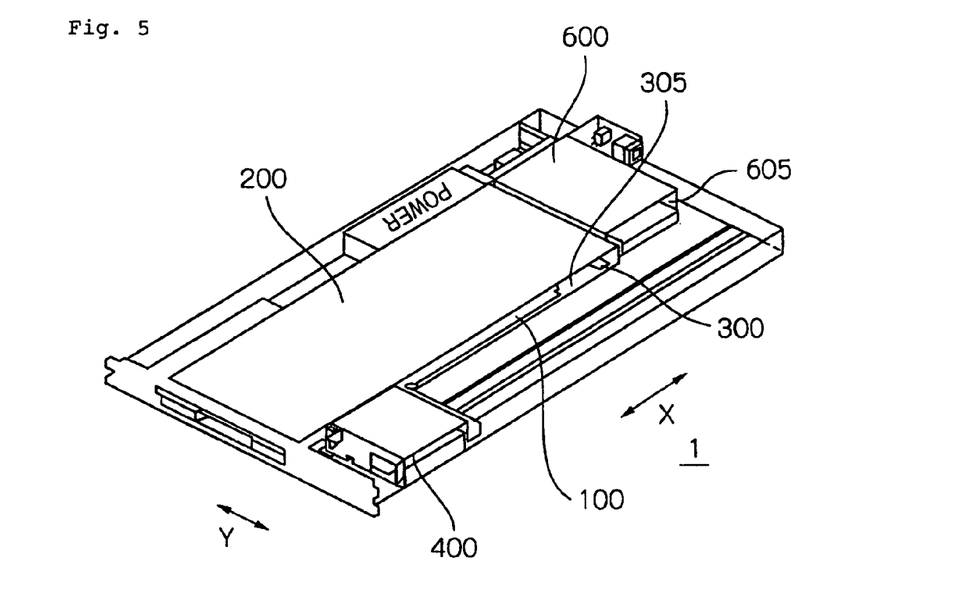
FIG. 5 is an outer perspective view of an exemplary embodiment of the library device of the present invention.
Figure 6:
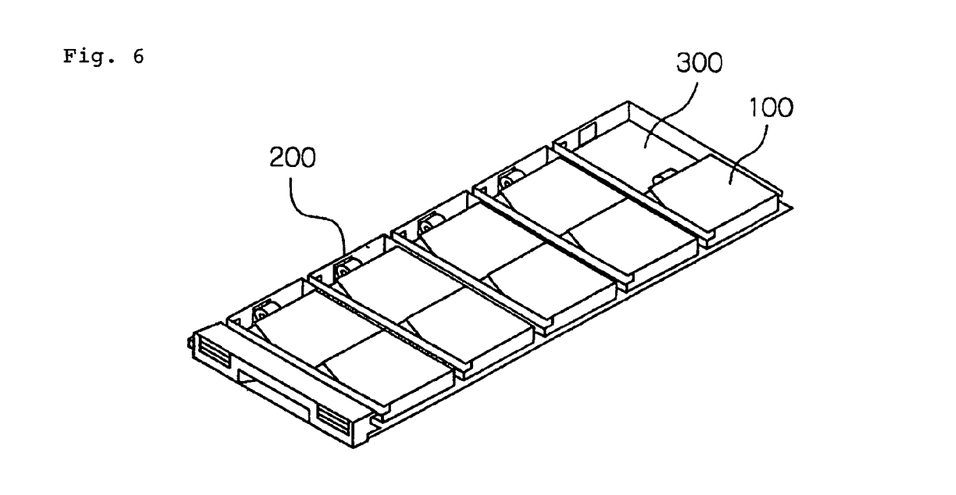
FIG. 6 is an outer perspective view of an example of a magazine.
Figure 7:
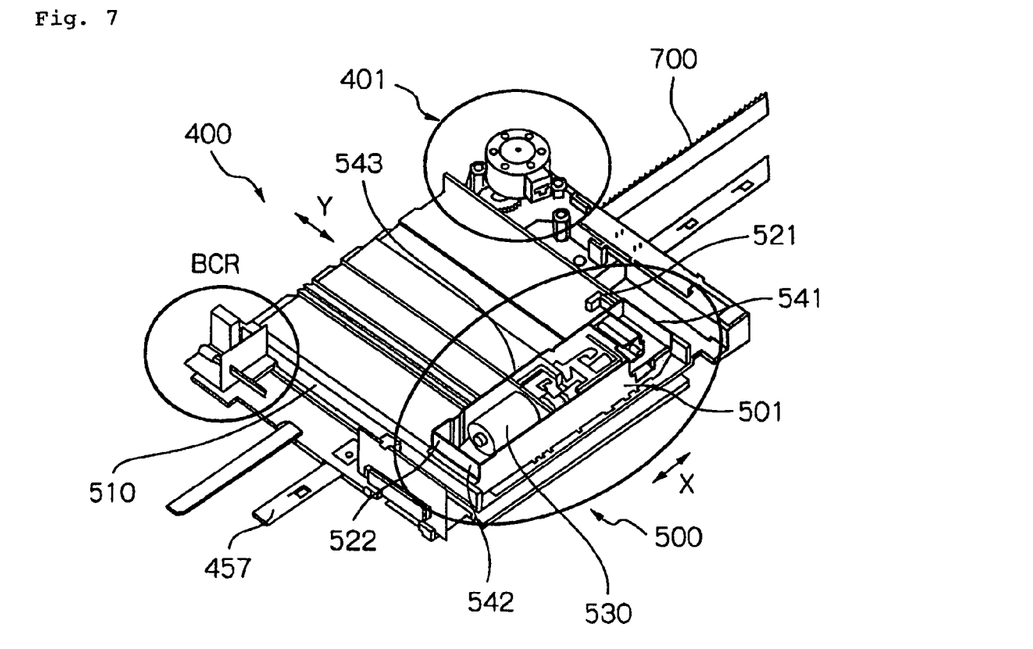
FIG. 7 is a perspective view showing the configuration of the accessor mechanism.
Figure 8A:
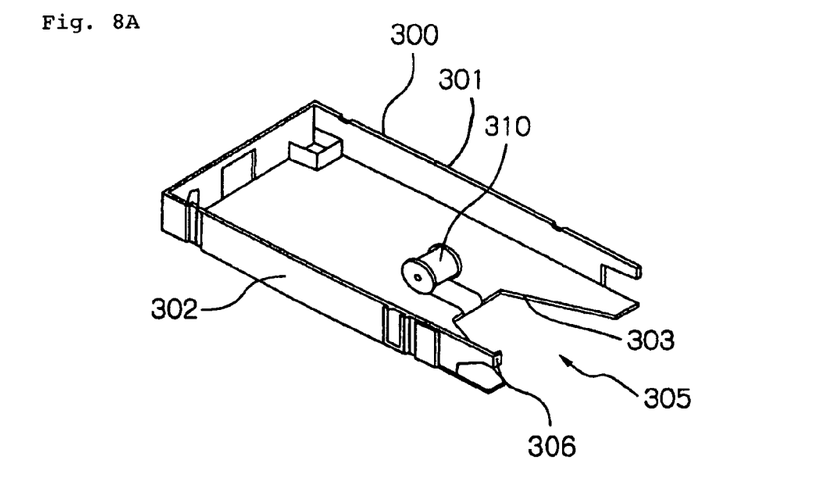
FIG. 8A is a perspective view for explaining the basic structure of a deep cell in a state in which a data cartridge is not accommodated in the deep cell.
Figure 8B:
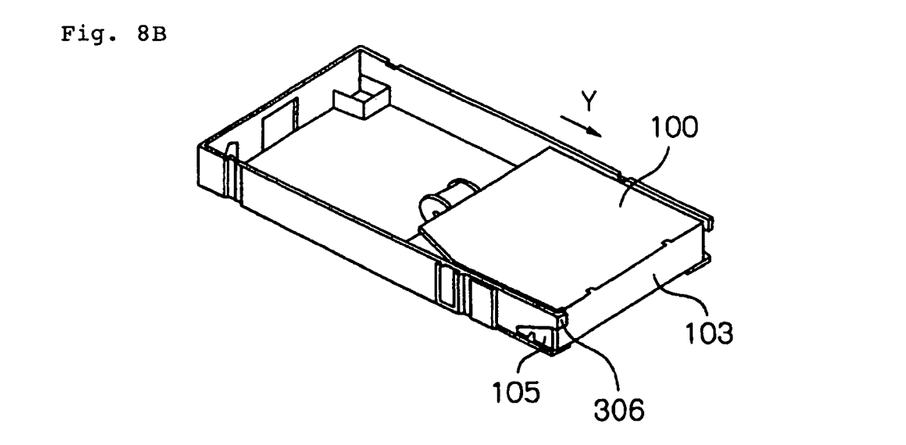
FIG. 8B is a perspective view for explaining the basic structure of a deep cell in a state in which one data cartridge is accommodated in the deep cell.
Figure 8C:
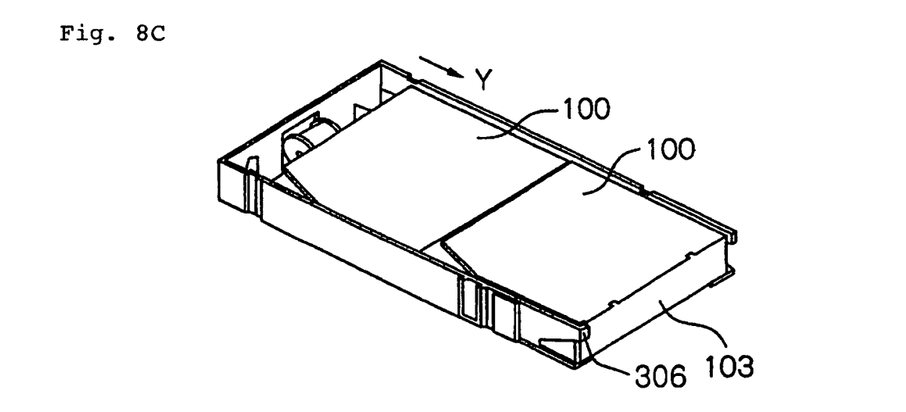
FIG. 8C is a perspective view for explaining the basic structure of a deep cell in a state in which two data cartridges are accommodated in the deep cell.

FIG. 4A is a plan view of the library device of the present exemplary embodiment. FIG. 4B is a front view of the library device of the present exemplary embodiment. FIG. 5 is an outer perspective view of the library device of the present exemplary embodiment. FIG. 6 is an outer perspective view of a magazine, and FIG. 7 is a perspective view showing the configuration of the accessor mechanism. FIG. 8 is a perspective view for explaining the structure of a cell.

The library device of the present exemplary embodiment includes: magazine 200, drive device 600, and accessor mechanism 400. Magazine 200 includes a plurality of cells 300 for accommodating data cartridges 100. Drive device 600 carries out reading of data from and writing of data to the recording medium in data cartridge 100. Accessor mechanism 400 transports data cartridge 100.

In the present exemplary embodiment, one magazine 200 and drive device 600 are arranged adjacent to each other, and the open directions of openings 305 of cells 300 accommodated in magazine 200 and opening 605 of drive device 600 are directed in the same direction.

Accessor Mechanism

Accessor mechanism 400 is a structure that can be moved back and forth by drive unit 401, and further, that is equipped with picker frame 510. Picker mechanism 500 is mounted in this picker frame 510 such that picker mechanism 500 can move in the Y direction.

Drive unit 401 is made up from a motor and a drive gear series. The final gear of this drive gear series engages with rack 700 that extends in the X-direction. When the motor of drive unit 401 is rotationally driven in the forward and reverse directions, accessor mechanism 400 moves back and forth in the X-direction in the figure along guide rail 457 under this drive power. The movement mechanism of accessor mechanism 400 may be made up from a combination of a known timing belt and pulley as long as accurate positioning is possible in the X-direction.

Although accessor mechanism 400 has been described as a component that moves in only a horizontal direction in the present exemplary embodiment, when magazine 200 is stacked in multiple levels, a structure capable of movement in the vertical direction may be provided.

Picker Mechanism

Picker mechanism 500 carries out operations for holding data cartridge 100 and for inserting this data cartridge 100 into and removing data cartridge 100 from drive device 600 and cells 300 of magazine 200. By means of these operations, accessor mechanism 400 that is equipped with picker mechanism 500 is capable of transporting data cartridge 100 between cells 300 and drive device 600, between each cell 300, or between each drive device 600.

Picker mechanism 500 includes box-shaped main unit 501 that is made up from: front surface 543, first side surface 541, second side surface 542 positioned on the surface opposite first side surface 541, and a rear surface.

Picker arm 521 is provided on first side surface 541 that is the side in the direction that crosses the horizontal direction of movement of accessor mechanism 400. Picker arm 521 extends in the direction of front surface 543 from first side surface 541 and is shaped such that its tip portion is bent toward second side surface 542 at a location that is beyond front surface 543.

As will be explained hereinbelow, second side surface 542 functions as ejection release part 522 for pressing open cartridge lock 306 of cell 300. In the present exemplary embodiment, second side surface 542 is used as ejection release part 522, but ejection release part 522 may also be provided separately on the second side surface 542 side.

Picker mechanism 500 accommodates picker drive motor 530 in main unit 501. Picker drive motor 530 drives picker mechanism 500 in the Y-direction in picker frame 510.

Cells

Cell 300 is the so-called deep cell that is capable of accommodating two data cartridges 100 in the longitudinal direction, and as shown in FIG. 8A, includes on its bottom surface 303 constant-force spring 310 for energizing data cartridge 100 toward the opening 305 side. Cell 300 has cartridge lock 306 on the opening 305 side of second side surface 302 that is positioned opposite first side surface 301.

Constant-force spring 310 is a spring that is a thin plate that is tightly wound at a fixed curvature, is used by stretching its outer end linearly, and has a characteristic by which the load is substantially constant regardless of the stroke. Constant-force spring 310 applies substantially the same load to data cartridges 100 whether one data cartridge 100 is accommodated in cell 300 as in FIG. 8B or two data cartridges 100 are accommodated as shown in FIG. 8C. In addition, the means for energizing data cartridge 100 toward the opening 305 side is not limited to constant-force spring 310, and an ordinary coil spring may also be used. In the case of a coil spring, the load increases with the length of the stroke.

Cartridge lock 306 includes an engagement part in which the tip portion of a plate spring formed by cutting out one part of second side surface 302 is bent toward the opening 305 side. Cartridge lock 306 prevents unintended ejection of data cartridge 100 from cell 300 by engagement with the second side surface 105 side of rear surface 103 of data cartridge 100.

Data Cartridge

Data cartridge 100 is a recording medium for reading and writing data shared by computers (not shown) that are connected to the library device by way of a communication line such as an LAN (Local Area Network) or Internet. Examples of this type of recording medium include tape media such as LTO or DLT and disk media such as DVD, magneto-optical disk (MO), or MD that are each accommodated in the housing.

Figure 9:
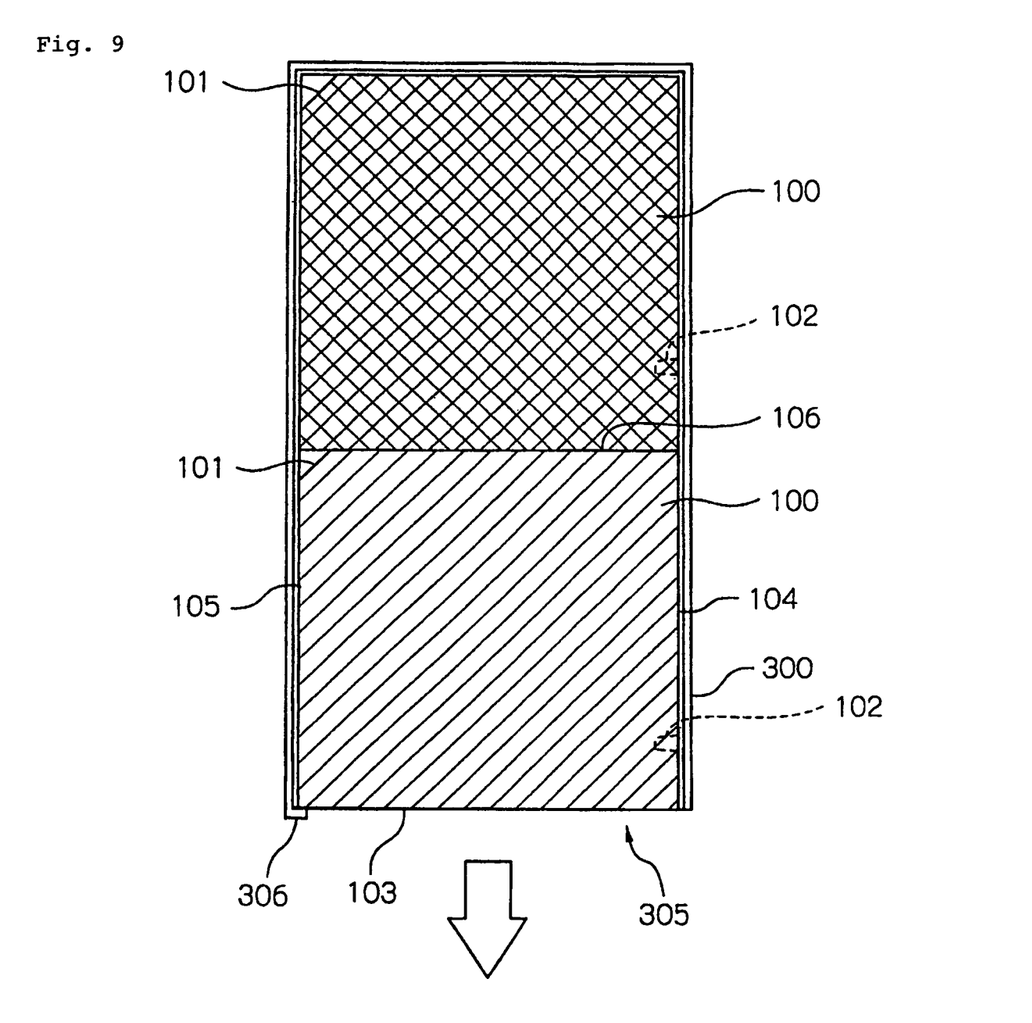
FIG. 9 is a schematic plan view of a cell and data cartridge that are used in the library device of the present invention.

As shown in FIG. 9, engagement hole 102 is formed near rear surface 103, which is first side surface 104 of data cartridge 100 of the present exemplary embodiment. In addition, tapered surface 101 is formed at the corner of second side surface 105 and front surface 106. Second side surface 105 is the surface formed opposite first side surface 104. Engagement hole 102 is a hole for engaging with picker arm 521. Tapered surface 101 is an inclined surface provided for pressing open cartridge lock 306 when data cartridge 100 is inserted into cell 300. In addition, first side surface 104 and second side surface 105 make up surfaces that are parallel to the direction of insertion into cell 300. Regarding tapered surface 101, only a portion of the object surface may be a tapered surface.

In the present exemplary embodiment, tapered surface 101 is formed at the corner portion between second side surface 105 and front surface 106, but depending on the position of cartridge lock 306, tapered surface 101 may also be formed on the corner between front surface 106 and a surface parallel to the direction of insertion into cell 300 other than second side surface 105.

Drive Device

Drive device 600 is a read/write device for reading data that are written on data cartridge 100 that is loaded in drive device 600, and further, for writing data that have been updated by the computer operator to data cartridge 100.

The various transport operations of data cartridges 100 in the present library device will next be described while referring to FIGS. 10A-10D and FIGS. 11A-11E.

(1) Operations for Extracting a Data Cartridge from a Cell

FIGS. 10A-10D show operations for extracting data cartridge 100 that is accommodated in cell 300 of magazine 200.

Of the Y-directions in the figures, the $Y_1$ direction is the direction of approach of picker mechanism 500 to cell 300, and the $Y_2$ direction indicates the direction of increasing distance of picker mechanism 500 from cell 300. In addition, the $X_1$ direction is the direction of movement of accessor mechanism 400 from the first side surface 104 side of data cartridge 100 and toward the second side surface 105 side on which cartridge lock 306 is provided, and the X2 direction indicates the opposite direction of movement of accessor mechanism 400.

Figure 10A:
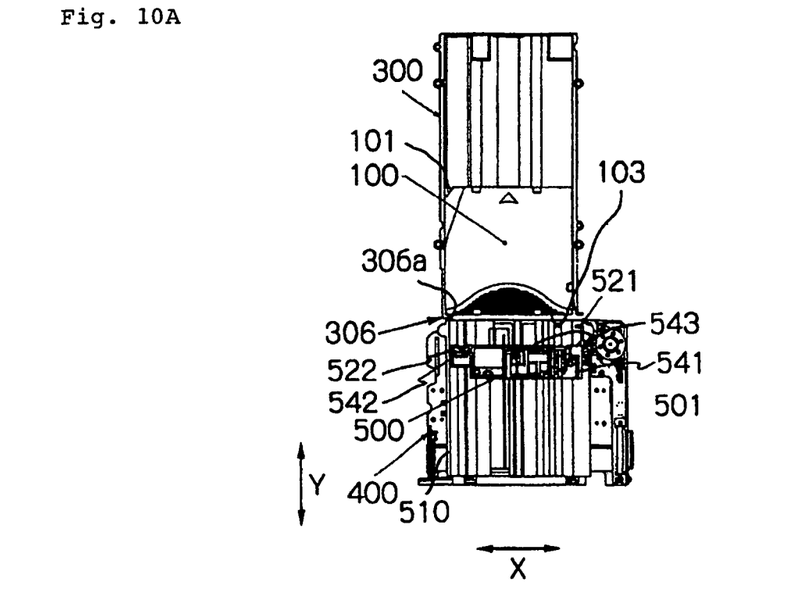
FIG. 10A is a view for explaining the operation of taking out a data cartridge from a cell in the library device of the present invention, and shows the state in which the accessor mechanism is disposed at a position that confronts a data cartridge that is to be extracted from a cell.

When data cartridge 100 is to be removed from cell 300, picker mechanism 500 is first moved in the X-direction by accessor mechanism 400 as shown in FIG. 10A, and is disposed at a position such that the opening of picker frame 510 confronts data cartridge 100 that is to be removed from cell 300. At this time, picker arm 521 of picker mechanism 500 is accommodated within picker frame 510. In the state shown in FIG. 10A, picker mechanism 500 is arranged at a position in picker frame 510 such that end 306a of cartridge lock 306 does not impact side surface 542 of picker mechanism 500 even if picker mechanism 500 moves in the $Y_1$ direction. In addition, this position is also a position at which picker arm 521 does not impact data cartridge 100 even if picker mechanism 500 moves in the $Y_1$ direction.

Figure 10B:
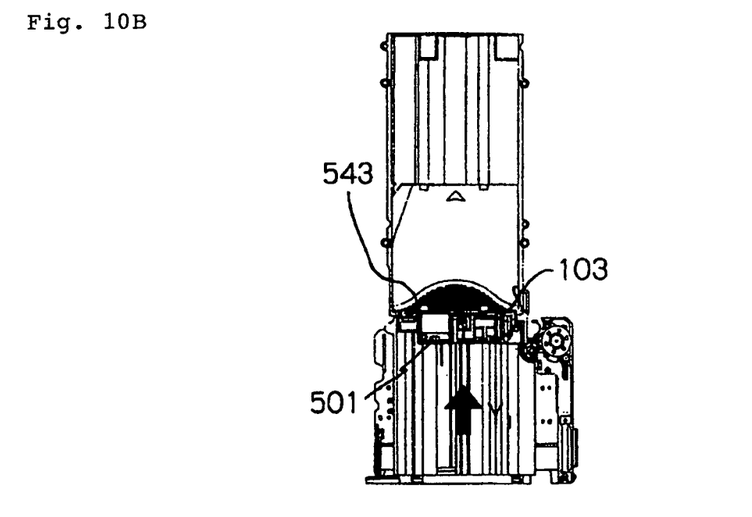
FIG. 10B is a view for explaining the operation of taking out a data cartridge from a cell in the library device of the present invention, and shows the state in which the picker mechanism is being moved toward the cell.

Next, as shown in FIG. 10B, picker mechanism 500 is moved toward the direction of cell 300 ($Y_1$ direction). Picker mechanism 500 is halted at the position where front surface 543 of main unit 501 of picker mechanism 500 contacts rear surface 103 of data cartridge 100. In this state, second side surface 542, which is ejection release part 522, confronts cartridge lock 306, and moreover, the tip of picker arm 521 confronts engagement hole 102 of data cartridge 100.

Figure 10C:
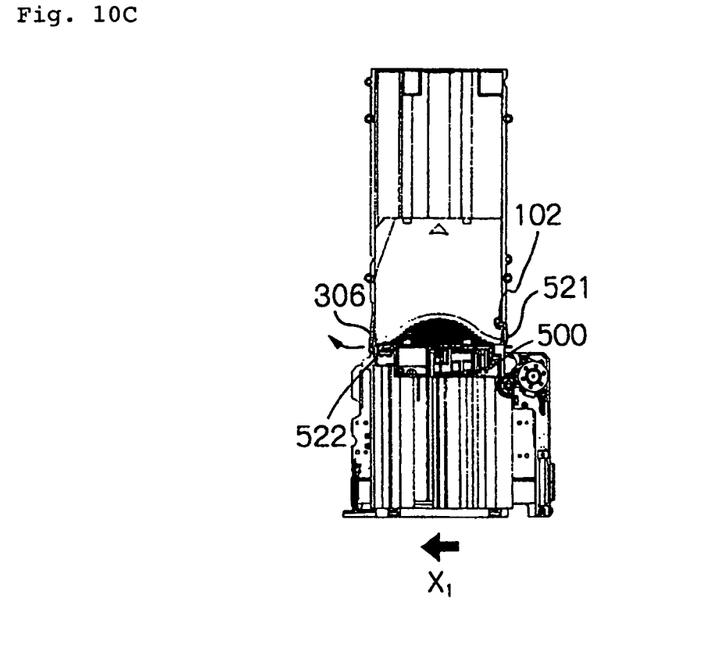
FIG. 10C is a view for explaining the operation of taking out a data cartridge from a cell in the library device of the present invention, and shows the state in which the accessor mechanism is moved toward of the cartridge lock.

Next, as shown in FIG. 10C, accessor mechanism 400 is moved toward the direction of cartridge lock 306 (the $X_1$ direction). The movement of accessor mechanism 400 in the $X_1$ direction causes second side surface 542 of picker mechanism 500 to press open cartridge lock 306 in the direction of the opening and causes cartridge lock 306 to retract. The locking of cartridge lock 306 is thus released, and at the same time, the tip of picker arm 521 fits into engagement hole 102 of data cartridge 100. In other words, in the library device of the present exemplary embodiment, the direction in which picker arm 521 engages and the direction in which cartridge lock 306 releases are the same $X_1$ direction, and the $X_1$ direction is additionally one of the directions of movement of accessor mechanism 400. As a result, in the library device of the present exemplary embodiment, by one of the actions of accessor mechanism 400, i.e., the movement of accessor mechanism 400 in the $X_1$ direction, the engagement of picker arm 521 and the release of cartridge lock 306 can be carried out simultaneously.

Figure 10D:
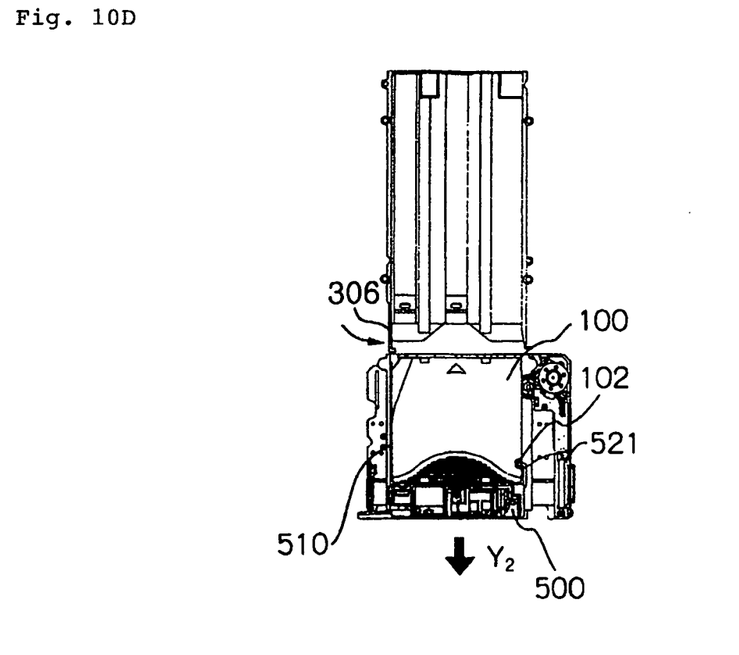
FIG. 10D is a view for explaining the operation of taking out a data cartridge from a cell in the library device of the present invention, and shows the state in which the data cartridge is being pulled from the cell.

Next, as shown in FIG. 10D, in a state in which locking realized by cartridge lock 306 has been released, moving picker mechanism 500 in the $Y_2$ direction causes picker arm 521 to pull data cartridge 100 from within cell 300.

In the case of the present exemplary embodiment, data cartridge 100 is energized toward the direction of opening 305 (the $Y_2$ direction) by constant-force spring 310. In addition, there is no latch that must be cleared as shown in FIG. 3 in cell 300. And as a result, the drive power required for the removal of data cartridge 100 from within cell 300 is quite small. In other words, a small motor is sufficient for picker drive motor 530, and power conservation and miniaturization can both be achieved.

Receiving data cartridge 100 from within cell 300 into picker frame 510 completes the operation of extracting data cartridge 100. By completely withdrawing data cartridge 100 from cell 300, cartridge lock 306 returns to its original position from the position of retraction.

(2) Operations for Storing a Data Cartridge to a Cell

FIGS. 11A-11E show the operations of receiving data cartridge 100, that was inserted into picker frame 510 of accessor mechanism 400, into cell 300 of magazine 200.

When data cartridge 100 that is received in picker frame 510 is to be received into cell 300, picker mechanism 500 is first moved in the X direction by accessor mechanism 400 and the opening of picker frame 510 is placed at a position that confronts the opening of cell 300, as shown in FIG. 11. At this point in time, the tip of cartridge lock 306 is in a position of entering opening 305, and is in a state that obstructs the entry of data cartridge 100 into cell 300.

Figure 11A:
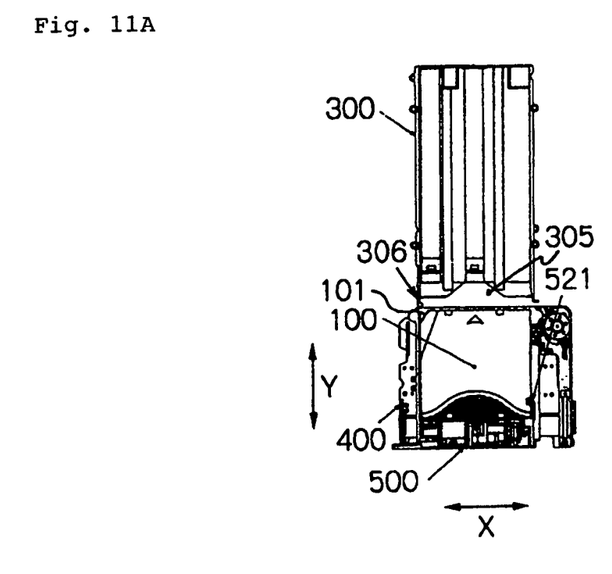
FIG. 11A is a view for explaining the operation of receiving a data cartridge in a cell in the library device of the present invention, and shows the state in which the data cartridge is arranged at a position that confronts the cell in which the data cartridge is to be stored.
Figure 11B:
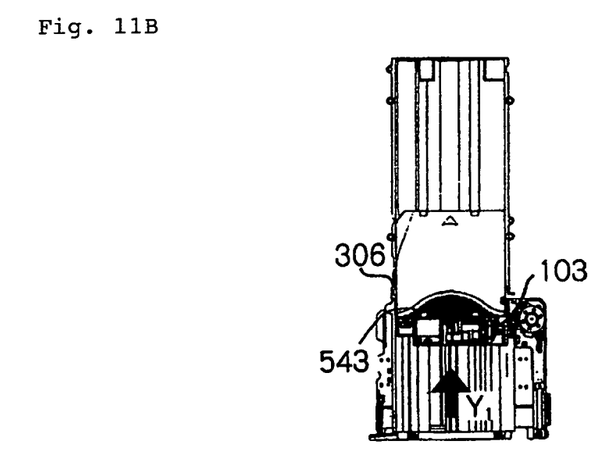
FIG. 11B is a view for explaining the operation of receiving a data cartridge in a cell in the library device of the present invention, and shows the state in which the picker mechanism is moved toward the direction of the cell.

Next, as shown in FIG. 11B, picker mechanism 500 is moved in the $Y_1$ direction, whereby front surface 543 of main unit 501 of picker mechanism 500 presses rear surface 103 of data cartridge 100 toward cell 300. When data cartridge 100 reaches opening 305 of cell 300, the tip of cartridge lock 306 contacts tapered surface 101 of data cartridge 100. When data cartridge 100 is further pressed toward cell 300, the tip of cartridge lock 306 begins to rub over tapered surface 101, whereby cartridge lock 306 is pressed open and is caused to retract and data cartridge 100 can be advanced into cell 300.

Figure 11C:
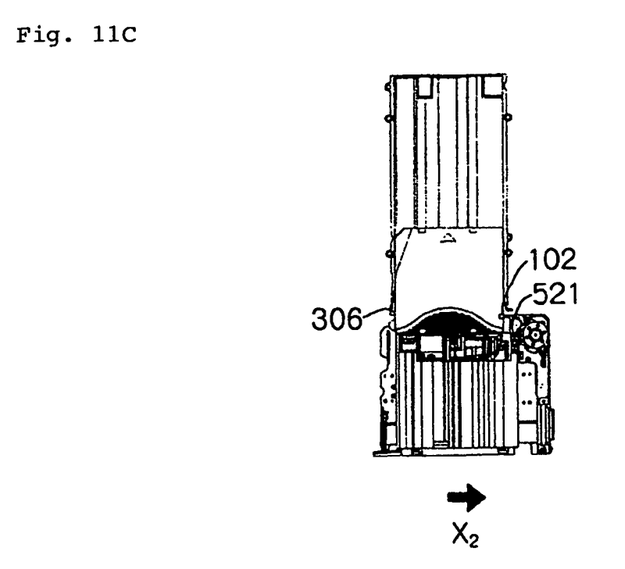
FIG. 11C is a view for explaining the operation of receiving a data cartridge in a cell in the library device of the present invention, and shows the state in which accessor mechanism 400 has been moved in the $X_2$ direction in a state in which the data cartridge has advanced exactly a predetermined distance into the cell.

Next, as shown in FIG. 11C, in the state in which data cartridge 100 has advanced a predetermined distance into cell 300, accessor mechanism 400 is moved in the $X_2$ direction. Accessor mechanism 400 is caused to move in the $X_2$ direction until the tip of picker arm 521 is withdrawn from engagement hole 102 of data cartridge 100 and the engagement between picker arm 521 and engagement hole 102 is released.

Figure 11D:
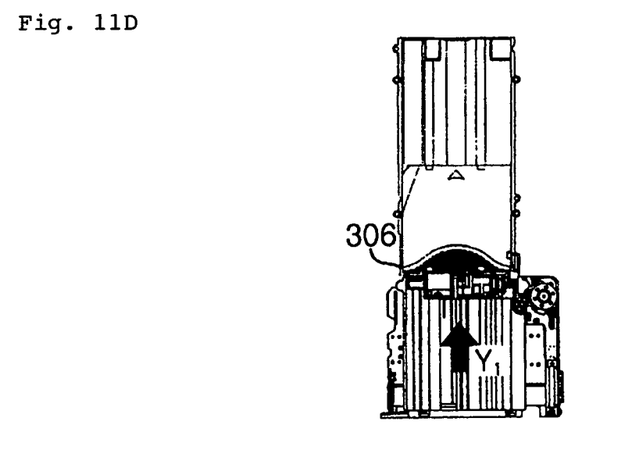
FIG. 11D is a view for explaining the operation of receiving a data cartridge in a cell in the library device of the present invention, and shows the state in which the picker mechanism has been moved in the $Y_1$ direction to the point that the data cartridge is completely accommodated in the cell.

Next, as shown in FIG. 11D, picker mechanism 500 is moved further in the $Y_1$ direction until data cartridge 100 is completely accommodated in cell 300. Cartridge lock 306 rubs over second side surface 105 of data cartridge 100 and engages with rear surface 103 when it reaches rear surface 103, whereby data cartridge 100 is locked.

Figure 11E:
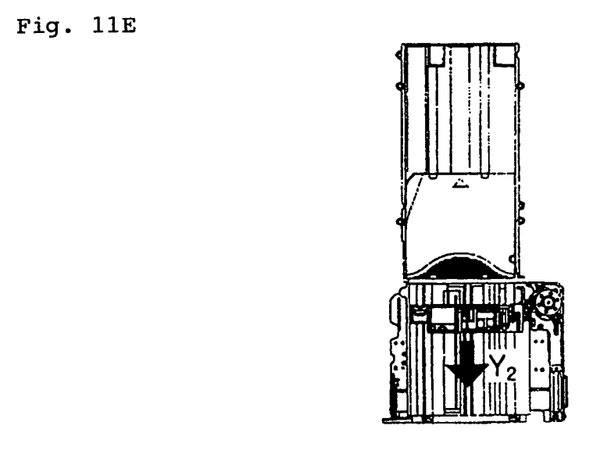
FIG. 11E is a view for explaining the operation of receiving a data cartridge in a cell in the library device of the present invention, and shows the state in which the picker mechanism has been moved in the Y2 direction and the state in which operation of storing the data cartridge in the cell has been completed.

Next, as shown in FIG. 11E, picker mechanism 500 is moved in the $Y_2$ direction, and the operation of receiving data cartridge 100 in cell 300 is completed.

As described in the foregoing explanation, according to the library device of the present exemplary embodiment, cartridge lock 306 can more reliably hold data cartridges 100 in cell 300 even for cell 300 of the deep-cell type for storing a plurality of data cartridges 100. Then, when data cartridge 100 is to be ejected from cell 300, this cartridge lock 306 is released by the ejection release part at the same time picker arm 521 engages engagement hole 102. In other words, releasing the lock and engaging the picker arm can be carried out by a single operation, whereby pointless operations can be eliminated.

In addition, when data cartridge 100 is inserted into cell 300, this cartridge lock 306 is caused to retract as far as a lock-release position by tapered surface 101 that is provided on data cartridge 100. In other words, according to data cartridge 100 of the present exemplary embodiment, cartridge lock 306, which becomes an obstacle when inserting data cartridge 100, can be caused to retract by an extremely simple configuration.

In addition, the layout of magazine 200 and drive device 600 such that openings 305 of cells 300 and opening 605 of drive device 600 are facing in the same direction eliminates the need for a swivel mechanism in the accessor mechanism, whereby miniaturization of the library device can be achieved.

Although the invention of the present application has been described with reference to an exemplary embodiment, the invention of the present application is not limited to the above-described exemplary embodiment. The configuration and details of the invention of the present application are open to various modifications within the scope of the invention of the present application that will be readily understood by persons with ordinary skill in the art.

This application claims the benefits of priority based on JP-A-2007-253985 for which application was submitted on Sep. 28, 2007 and incorporates all of the disclosures of that application by citation.

What is claimed is:

1. A library device, comprising:
a drive device comprising an opening and carrying out reading and writing of a recording medium that is accommodated in a data cartridge which is inserted and taken out through the opening;
a cell comprising an opening and receiving a plurality of ones of said data cartridge which are inserted and taken out through the opening of said cell;
a constant-force spring urging said plurality of ones of said data cartridge being accommodated in said cell, in a taking-out direction in which the data cartridge is taken out from said cell;
a magazine provided with a plurality of ones of said cell;
a picker mechanism inserting said plurality of ones of said data cartridge into said drive device and the plurality of ones of said cell, and taking out said plurality of ones of said data cartridge from said drive device and the plurality of ones of said cell; and
an accessor mechanism equipped with said picker mechanism for transporting said picker mechanism between said drive device and each of the plurality of ones of said cell,
wherein said drive device and the plurality of ones of said cell are aligned such that opening directions of the opening of said drive device and the openings of the plurality of ones of said cell in said magazine are a same direction,
wherein at least one of the plurality of ones of said cell comprises a deep cell receiving the plurality of said plurality of ones of said data cartridge in an opening direction of the opening of said cell, and includes a cartridge lock holding said plurality of ones of said data cartridge in the plurality of ones of said cell by locking, in the opening of said cell;
wherein said picker mechanism includes a picker arm that engages with an engagement hole in said plurality of ones of said data cartridge, and an ejection release part that releases locking of said cartridge lock,
wherein said cartridge lock is movable between a first position at which said cartridge lock locks said data cartridge and a second position at which said cartridge lock releases said data cartridge,
wherein, when said data cartridge is to be inserted in said cell, moving said data cartridge in an insertion direction in which said data cartridge is inserted into said cell by moving said picker mechanism in the insertion direction causes said cartridge lock to move from the first position to the second position by a tapered surface provided on said data cartridge, said tapered surface having a shape which is tapered in the insertion direction, and
wherein, when said data cartridge is to be taken out from said cell, moving said accessor mechanism causes said cartridge lock to move from the first position to the second position by said ejection release part at a same time that said picker arm engages with said engagement hole.

2. The library device as set forth in claim 1, wherein a direction in which said picker arm engages with said data cartridge is a same direction as a direction in which said cartridge lock releases said data cartridge, and as a direction of a movement of said accessor mechanism moving said cartridge lock from the first position to the second position.

3. The library device as set forth in claim 1, wherein said picker arm is provided on a side surface of said accessor mechanism in a direction that crosses a direction of a horizontal movement of said accessor mechanism, and said ejection release part is provided on the side surface of said accessor mechanism that is an opposite side of a side surface on which said picker arm is provided.

4. The library device as set forth in claim 1, wherein said cartridge lock engages with a rear surface of said data cartridge, the rear surface being rearward of the insertion direction.

5. The library device as set forth in claim 1, wherein, when said data cartridge is to be taken out from said cell, said moving said accessor mechanism causes said cartridge lock to move from the second position to the first position by said tapered surface.

6. The library device as set forth in claim 1, wherein, when said data cartridge is to be taken out from said cell, said moving said accessor mechanism causes said cartridge lock to move from the second position to the first position by said tapered surface before an entire data cartridge is ejected from the deep cell.

7. The library device as set forth in claim 1, wherein said moving said accessor mechanism causes said cartridge lock to move from the second position to the first position by said tapered surface before an entire data cartridge is ejected from the deep cell.

8. The library device as set forth in claim 1, wherein a direction in which said picker arm engages with said data cartridge comprises a same direction as a direction of a movement of said accessor mechanism moving said cartridge lock from the first position to the second position.

* * * * *